United States Patent [19]

Nishizawa et al.

[11] Patent Number: 4,463,024

[45] Date of Patent: Jul. 31, 1984

[54] FLAVORING MATERIAL AND PROCESS FOR PRODUCING DRINKS AND FOODS EXCELLENT IN FLAVOR

[75] Inventors: Yoshihiko Nishizawa, Noda; Taihei Takezawa, Enzan; Takashi Shinohara, Kashiwa, all of Japan

[73] Assignees: Kikkoman Corporation, Noda; Mann's Wine Co., Ltd., Tokyo, both of Japan

[21] Appl. No.: 340,893

[22] Filed: Jan. 19, 1982

[30] Foreign Application Priority Data

Jan. 27, 1981 [JP] Japan .................................... 56-9728
Jan. 28, 1981 [JP] Japan ................................... 56-10266

[51] Int. Cl.³ .......................... A23L 1/221; A23L 1/28
[52] U.S. Cl. .................................... 426/533; 426/429; 426/431; 426/447; 426/650; 426/655
[58] Field of Search ............... 426/650, 651, 655, 533, 426/506, 511, 445, 447, 429, 431, 478, 481, 489; 202/234; 203/95, 96; 162/21

[56] References Cited

U.S. PATENT DOCUMENTS

| | | | |
|---|---|---|---|
| 1,793,711 | 2/1931 | Mitscherling | 162/21 |
| 2,007,727 | 7/1935 | Putt | 426/533 |
| 2,080,078 | 5/1937 | Mason et al. | 162/21 |
| 2,224,135 | 12/1940 | Boehm | 162/21 |
| 3,667,961 | 6/1972 | Algeo | 426/447 |
| 4,136,207 | 1/1979 | Bender | 426/447 |

FOREIGN PATENT DOCUMENTS 47-4519 2/1972 Japan .

OTHER PUBLICATIONS

Casey, Pulp and Paper, 2nd Ed., Interscience Publishers, Inc., N.Y., 1960 (pp. 332 and 333).

Primary Examiner—George Yeung
Attorney, Agent, or Firm—Banner, Birch, McKie & Beckett

[57] ABSTRACT

A flavoring material comprising a flavoring wooden material obtained by treating a wooden raw material with pressure and heat for a time period of 30 seconds or longer in the presence of a saturated steam having a pressure of 4 kg/cm².G or higher or a super-heated steam having a temperature of 151° C. or higher and thereafter rapidly or slowly discharging the wooden material into an atmosphere having a lower pressure, and a process for producing drinks and foods to which said flavoring material has been added.

10 Claims, No Drawings

FLAVORING MATERIAL AND PROCESS FOR PRODUCING DRINKS AND FOODS EXCELLENT IN FLAVOR

This invention relates to a flavoring material comprising a flavoring wooden material, as well as to drinks and foods excellent in flavor and taste and a process for producing said drinks and foods. More particularly, it relates to a flavoring material comprising a flavoring wooden material obtained by treating a wooden raw material with pressure and heat in the presence of saturated steam or super-heated steam and then discharging the wooden material into an atmosphere having a lower pressure, as well as to drinks and foods excellent in flavor and taste and a process for producing them.

As a flavoring material produced from wooden material, there is hitherto known a product produced by extracting a wooden material with water, hot water, alcohol or the like either directly or after heat-treating the wooden material at ordinary pressure or in the presence of an acid, an alkali or the like (Japanese Patent Publication No. 4,519/72).

However, by the above-mentioned means, the cell walls surrounding the cells (composed mainly of fibrous substance) constructing a wooden material and the packing structure of lignin existing between cells and bonding them can hardly be destructed, and therefore the extracting solvent can hardly permeate into inside of wooden texture. Thus, the useful flavor components contained in the wooden material cannot sufficiently be eluted, and the flavoring material obtained is weak in flavor and taste and unsatisfactory in the balance of flavor components.

In view of above, the present inventors conducted elaborated studies with the aim of overcoming the above-mentioned faults. As the results, it was found that a wooden material obtained by treating a wooden raw material with pressure and heat for 30 seconds or longer in the presence of a saturated steam having a pressure of 4 kg/cm$^2$.G or higher or a super-heated steam having a temperature of 151° C. or higher and then rapidly or slowly discharging the wooden material into an atmosphere having a lower pressure or a product obtained by extracting said wooden material with an extracting solvent such as alcohol, alcohol-containing liquid, water or the like is a flavoring material markedly excellent in flavor and taste and that drinks and foods markedly excellent in flavor and taste can be obtained by adding said flavoring material to drinks and foods such as seasonings, alcoholic drinks, unbaked cakes, foods preserved in sugar, chocolate and the like or by adding said flavoring material in the production steps of said drinks and foods. Based on this finding, the present invention was accomplished.

It is an object of this invention to provide a flavoring material suitable for giving a flavor and taste to various drinks and foods such as, particularly, seasonings, alcoholic drinks and the like.

It is another object of this invention to provide a process for producing drinks and foods very excellent in flavor and taste by the use of said flavoring material.

Other objects and advantages of this invention will become apparent from the descriptions given below.

According to this invention, there is provided a flavoring material comprising a flavoring wooden material obtained by treating a wooden raw material with pressure and heat for 30 seconds or longer in the presence of a saturated steam having a pressure of 4 kg/cm$^2$.G or higher or a super-heated steam having a temperature of 151° C. or higher and then rapidly or slowly discharging the wooden material into an atmosphere having a lower pressure or one comprising a product obtained by subjecting said wooden material to an extraction treatment with a solvent and removing the residue from the extract, as well as a process for producing drinks and foods excellent in flavor and taste characterized by adding said flavoring material to drinks and foods or in the production steps of said drinks and foods.

Hereunder, this invention will be explained in detail.

In the first place, the wooden raw material used in this invention may be a wood belonging to any plant species. However, plant species such as white oak, Japanese oak, red oak, Japanese beech, oak, maple, cherry, Japan cedar, pine and the like are preferable, among which white oak and Japanese oak are particularly preferable in point of flavor and taste.

The wooden raw material may be used as it is. However, it is also allowable to use the wooden raw material after slicing it by means of a plane, slicer or the like, or after granualting it by means of a disc-formed chipper for pulp or the like, or after pulverizing it by means of a grinder. In conclusion, the wooden raw material may have any form so far as it is a wooden raw material having a size enabling the supply into the apparatus for applying pressure and heat. Said wooden raw material may be used as it is. Optionally, however, it is also allowable to use the wooden raw material after mixing it with an appropriate quantity of water.

Next, in this invention, said wooden raw material is thrown into an apparatus for applying pressure and heat and subjected to a pressurizing-heating treatment with a saturated steam having a pressure of 4 kg/cm$^2$.G or higher and preferably 6-20 kg/cm$^2$.G or a super-heated steam having a temperature of 151° C. or higher and preferably 164°-300° C., for a time period of 30 seconds or longer, and then the wooden material is slowly discharged into an atmosphere having a lower pressure such as atmospheric pressure to obtain a flavoring wooden material. Otherwise, after treating the wooden raw material under just the same conditions as above, it is rapidly discharged into an atmosphere having a lower pressure such as atmospheric pressure to obtain a flavoring puffed wooden material.

As the apparatus for applying pressure and heat mentioned above, any form and any structure of apparatuses can be used whether they are of continuous type or batch type. As the saturated steam or superheated steam used as medium for the heating and pressurizing, steams not containing air at all and steams containing a very small quantity of air can be used without trouble.

The wooden material which has been subjected to the above-mentioned pressurizing-heating treatment or pressurizing-heating-swelling treatment is used as a flavoring material either as it is or, optionally, crushing or pulverizing it by the conventional method. Further, a material prepared by adding thereto a spice, a sugar or the like conventionally used as additives of flavor in an appropriate manner can also be used as a flavoring material.

Further, according to this invention, it is also possible to obtain a flavoring solution by adding an extracting solvent such as alcohol, alcohol-containing liquid, water, liquefied carbon dioxide or the like to the wooden material obtained as above, which has been subjected to pressurizing-heating treatment or pressurizing-heatingswelling treatment, usually in an amount of about 2 times (V/W) or more based on said wooden material, extracting it at room temperature or at elevated temperature for a time period of 1 minute or longer and preferably 5 minutes or longer to extract the useful flavor and taste components in said wooden material, and removing the residue of extraction from the extract by the usual method.

As said alcohol or alcohol-containing liquid, ethyl alcohol or alcoholic drinks such as whisky, rum, brandy, liqueur, sherry, Japanese sake, Japanese shochu, fermented fruit drinks and the like are used.

The flavoring material obtained in the above-mentioned manner may be used as it is in the liquid state. However, it is also allowable to make it into a flavoring material by concentrating it under ordinary pressure or reduced pressure by the usual method, or to make it into a powdery flavoring material by further drying it by the usual method and optionally pulverizing it.

Here, the excellency, as a flavoring material, of the flavoring material of this invention comprising flavoring wooden material will be illustrated by way of experimental example.

EXPERIMENTAL EXAMPLE 1

Two hundred grams, per one plot, of white oak pulverized to a size of about 8–12 mesh was introduced into a horizontal, cylindrical pressure vessel (inner diameter: 150 $\phi$m/m, length: 160 m/m) having a horizontal, rotatable cylinder made of a porous plate (diameter: 120 $\phi$m/m, length: 150 m/m) in its inside, and the vessel was tightly closed. While rotating the cylinder made of porous plate in said vessel, saturated steam was supplied and the pressure in the vessel was kept at 2–15 kg/cm$^2$.G, as shown in Table 1, for 5 minutes. Then the lid of the vessel was rapidly opened to obtain a swollen wooden material subjected to pressurizing-heating treatment (flavoring material).

The control (untreated sample) was white oak pulverized to a size of about 8–12 mesh.

Ten liters of water was added to each 100 g of the above-mentioned puffed wooden materials subjected to pressurizing-heating treatment and untreated white oak. Each of the resulting mixtures was introduced into a porcelain-enameled pot having a capacity of 20 liters and mixed extracted at room temperature for 48 hours and then filtered with a filter paper (Toyo Filter Paper No. 5). The filtrate (sample) thus obtained was subjected to component analyses for extract component and polyphenol content, as well as to an organoleptic test by a panel consisting of 20 skilled persons. The results are shown in Table 1.

The analyses of extract and polyphenol and the organoleptic examination were performed according to the following methods.

(1) Extract: 10 ml of sample was preliminarily evaporated on a boiling steam bath and then the residue was dried for 3 hours in an oven kept at 100° C., after which its weight was measured and expressed by weight per 100 ml of sample.

(2) Polyphenol content: The amount of polyphenol in sample was determined according to the method of Folin-Denis (cf. Nakabayashi et al.: "Shokuhin no Kappen to Sono Kagaku (The Browning of Foodstuffs and Its Chemistry)", published by Korin Shoten, Oct. 20, 1972, p. 84.

(3) Organoleptic test: By a panel consisting of 20 skilled persons, ranking marks 1, 2, 3, 4, 5, 6 and 7 were given to samples in the decreasing order of the strength of "coffee-like flavor" which is generally considered pleasant. The results were expressed by the mean values.

TABLE 1

| Sample | Extract (mg/100 ml) | Polyphenol content (mg/100 ml) | Organoleptic test (mean value of ranking) |
|---|---|---|---|
| Untreated (control) | 67 | 31 | 5.88 |
| 2 kg/cm$^2$ · G (132° C.) | 74 | 32 | 4.73 |
| 4 kg/cm$^2$ · G (151° C.) | 102 | 42 | 3.99 |
| 6 kg/cm$^2$ · G (164° C.) | 155 | 65 | 2.55 |
| 8 kg/cm$^2$ · G (174° C.) | 179 | 88 | 1.83 |
| 10 kg/cm$^2$ · G (183° C.) | 199 | 89 | 1.56 |
| 15 kg/cm$^2$ · G (200° C.) | 200 | 93 | 1.88 |

It is apparent from Table 1 that, as compared with the flavoring materials which have been treated at a pressure of 2 kg/cm$^2$.G (132° C.) or less, the flavoring materials of this invention obtained by a pressurizing-heating treatment at a pressure of 4 kg/cm$^2$.G (151° C.) or above are larger in the amounts of extract and polyphenol and, in addition, quite excellent in flavor as revealed by organoleptic test, and that the effect of this invention is more marked when the pressure of the treatment is 6 kg/cm$^2$.G (164° C.) or higher.

Next, the excellency, as a flavoring material, of the aforementioned flavoring material of this invention (product obtained by extracting the above-mentioned wooden material with a solvent and removing the residue from the extract) will be illustrated with reference to Experimental Example 2.

EXPERIMENTAL EXAMPLE 2

Two hundred grams, per one plot, of white oak pulverized to a size of about 8–12 mesh was introduced into a horizontal, cylindrical pressure vessel (inner diameter: 150 $\phi$m/m, length: 160 m/m) having a horizontal, rotatable cylinder made of porous plate (diameter: 120 $\phi$m/m, length: 150 m/m) in its inside, and the vessel was tightly closed. While rotating the cylinder made of porous plate in the vessel, saturated steam was supplied and the pressure in the vessel was maintained at 2–15 kg/cm$^2$.G, as shown in Table 2, for 5 minutes. Then the lid of the vessel was rapidly opened to obtain a puffed wooden material subjected to pressurizing-heating treatment (pulverized product). Then, 10 liters of 40% (V/V) aqueous solution of ethyl alcohol was added to 100 g of this puffed wooden material. The mixture was introduced into a porcelain-enameled pot having a capacity of 20 liters, thoroughly mixed, and kept at room temperature for 48 hours to perform extraction. Then the extract was filtered with a filter paper (Toyo Filter Paper No. 5) to obtain 9.8 liter of flavoring material in each plot.

The control (untreated) was a flavoring material obtained by adding 10 liters of 40% (V/V) aqueous solution of ethyl alcohol to 100 g of white oak pulverized to a size of about 8–20 mesh and carrying out extraction and filtration in just the same manner as above.

On each of the samples (flavoring materials) mentioned above, the component analyses for extract and polyphenol content and organoleptic test by a panel consisting of 20 skilled persons were performed. The results are shown in Table 2.

The analyses of extract and polyphenol and the organoleptic test were carried out by the same methods as in Experimental Example 1.

TABLE 2

| Sample | Extract (mg/100 mg) | Polyphenol content (mg/100 ml) | Organoleptic test (mean value of ranking) |
|---|---|---|---|
| Untreated (control) | 98 | 60 | 5.65 |
| 2 kg/cm$^2$ · G (132° C.) | 106 | 78 | 4.50 |
| 4 kg/cm$^2$ · G (151° C.) | 159 | 90 | 3.55 |
| 6 kg/cm$^2$ · G (164° C.) | 188 | 120 | 2.55 |
| 8 kg/cm$^2$ · G (174° C.) | 305 | 144 | 1.90 |
| 10 kg/cm$^2$ · G (183° C.) | 342 | 152 | 1.55 |
| 15 kg/cm$^2$ · G (200° C.) | 350 | 160 | 1.65 |

It is apparent from Table 2 that, as compared with the product obtained by a treatment at a pressure of 2 kg/cm$^2$.G (132° C.) or less followed by extraction with solvent, the flavoring materials of this invention obtained by a pressurizing-heating treatment at a pressure of 4 kg/cm$^2$.G (151° C.) or higher followed by an extraction with solvent are larger in both the amounts of extract and polyphenol and, in addition, quite excellent in flavor as revealed by organoleptic test, and that the effect of this invention is more marked when the treatment is carried out at a pressure of 6 kg/cm$^2$.G (164° C.) or higher and extraction with solvent is carried out.

This invention also relates to a process for producing drinks and foods excellent in flavor and taste characterized by adding, to drinks and foods or drinks and foods in process of production, a flavoring material consisting of a wooden material subjected to a pressurizing-heating treatment obtainable by, as has been mentioned above, pressurizing and heating a wooden material in the presence of a saturated steam having a pressure of 4 kg/cm$^2$.G or higher or a super-heated steam having a temperature of 151° C. or higher for a time period of 30 seconds or longer and then slowly discharging the wooden material into an atmosphere having a lower pressure or a flavoring material obtained by extracting said wooden material subjected to pressurizing-heating treatment with a solvent and then removing the residue from the extract.

As preferable examples of said drinks and foods, there can be illustrated seasonings such as soy, miso (fermented bean paste), sauce and the like; alcoholic drinks such as whisky, brandy, rum, liqueur, sherry, Japanese sake, Japanese shochu, fermented fruit drinks and the like; unbaked cakes such as butter cream, sponge cake, poundcake, pie, cream cake, doughnut, castella and the like; foods preserved in sugar such as marron glacé, plum boiled in liquor and the like; chocolates such as shell chocolate, solid chocolate, covering chocolate and the like; and so on. The term "drinks and foods" should be interpreted in a broad sense, so that luxuries such as black tea, coffee and the like are also included therein.

If the flavoring material obtained in the above-mentioned manner according to this invention is added to the above-mentioned drinks and foods or into the process for producing said drinks and foods from a raw material by the conventional method in an appropriate amount, for example in an amount giving a concentration of 0.001% (W/W) or more, a drink or food very excellent in flavor and taste can be obtained with a high efficiency. Therefore, this invention is quite useful industrially.

This invention will be illustrated more concretely with reference to the following examples which are presented in no limitative way.

EXAMPLE 1

Chipped Japanese oak was fed into a pressurizing-heating-continuous cooking apparatus (the apparatus mentioned in Japanese Patent Publication No. 1,997/77) at a rate of 90 kg/hour. After pressurizing and heating it for 3 minutes with a saturated steam having a pressure of 6 kg/cm$^2$.G (164° C.), it was continuously and rapidly discharged into atmospheric air. Thus, pressurized, heated and puffed chips were obtained at a rate of 99 kg/hour or in a yield of 495 kg after operation for 5 hours. The chips were pulverized into a particle size of 40–80 mesh by means of an impact grinder (manufactured by Showa Giken K.K.), and there was obtained 423 kg of a flavoring material.

EXAMPLE 2

Chipped white oak was fed into a continuous type of pressurizing-heating apparatus (the apparatus mentioned in U.S. Pat. No. 3,661,071) at a rate of 45 kg/hour. After pressurizing and heating it for 1 minute with a super-heated steam having a pressure of 8 kg/cm$^2$.G (220° C.), it was sent into a screen type air-cooling apparatus working at an air pressure of 8 kg/cm$^2$.G, provided in succession to said pressurizing-heating apparatus, through a rotary valve, where it was cooled to a material temperature of 25° C. Then it was continuously discharged into atmospheric air to obtain pressurized and heated chips at a rate of 42 kg/hour or in a yield of 210 kg after operation for 5 hours. By pulverizing the chips into a particle size of 80–100 mesh by means of an impact grinder (manufactured by Hosokawa Tekko K.K.), 196 kg of a flavoring material was obtained.

EXAMPLE 3

Chipped white oak was fed into the same pressurizing-heating-continuous cooking apparatus as used in Example 1 at a rate of 45 kg/hour. After pressurizing and heating it for 6 minutes with a saturated steam having a pressure of 8 kg/cm$^2$.G (175° C.), it was continuously and rapidly discharged into the atmospheric air to obtain pressurized and heated puffed chips at a rate of 49 kg/hour or in a yield of 245 kg after operation for 5 hours. Then, the puffed chips were thrown into a stainless steel-made tank having a capacity of 20 kiloliters, to which was added 1,200 liters of a 40% (V/V) aqueous solution of ethyl alcohol. After thoroughly mixing the mixture with stirring, it was kept at room temperature for 3 days for the sake of extraction treatment and then separated into solid and liquid by means of centrifugal machine. Thus, 828 liters of a liquid flavoring material excellent in flavor and taste and having a dense color tone was obtained.

The analyses of the flavoring material thus obtained were as follows: extract: 6,200 mg/100 ml; polyphenol content: 2,950 mg/100 ml; absorbance at 400 m$\mu$ (50-fold dilution): 0.54 (O.D.).

EXAMPLE 4

Chipped Japanese oak was fed into the same continuous type pressurizing-heating apparatus as used in Example 2 at a rate of 50 kg/hour. After pressurizing and heating it for 1 minute with a super-heated steam having a pressure of 7 kg/cm$^2$.G 210° C.), it was sent into a screen type air-cooling apparatus working at an air pressure of 7 kg/cm².G, provided in succession to said pressurizing-heating apparatus, through a rotary valve, where it was cooled to a material temperature of 25° C. Then it was continuously discharged into the atmospheric air to obtain pressurized and heated chips at a rate of 48 kg/hour or in a yield of 240 kg after operation for 5 hours. Then, said pressurized and heated chips were thrown into a stainless steel-made tank having a capacity of 20 kilo-liters and having a valve equipped with filter at its bottom, to which was added 2,600 liters of rum (alcohol content 40% V/V). After homogenizing the mixture, it was kept at room temperature for 5 hours for the sake of extraction treatment and then the extract was discharged by opening the valve equipped with filter at the bottom of the tank. Thus, 2,080 liters of a liquid flavoring material quite excellent in flavor and taste was obtained.

The component analyses of the flavoring material thus obtained were as follows: extract: 1,650 mg/100 ml; polyphenol: 1,040 mg/100 ml. Its absorbance at 400 m$\mu$ (after 50-fold dilution) was 0.45 (O.D.).

EXAMPLE 5

One kilogram of apple, 1 kg of carrot, 0.2 kg of parsley, 3 kg of onion, 0.5 kg of ginger and 0.5 kg of garlic were sliced and introduced into a pressure cooker, to which were added 4 liters of water, 2 kg of sugar and 0.8 kg of edible salt. The mixture was cooked under elevated pressure for 120 minutes and then allowed to stand for 12 hours. Then, 0.2 kg of the flavoring material obtained in Example 1, 2 liters of soy, 2 g of sage, 2 g of laurel, 2 g of pepper and 2 g of thyme were added thereto and mixed, the resulting mixture was cooked for 60 minutes, 2.7 liters of vinegar was added, and the whole mixture was filtered to obtain 15 liters of a liquid sauce (acetic acid: 1.5% W/V; sodium chloride: 7.4% W/V; sugar: 16.7% W/V) excellent in flavor and taste.

Subsequently, an organoleptic test by a testing panel consisting of 60 skilled persons was carried out on the liquid sauce of this invention produced in the above-mentioned manner and a control liquid sauce produced by repeating the above-mentioned procedure except that the flavoring material of Example 1 was not added. The organoleptic test was performed after putting the sauce on pork cutlet. The results are shown in Table 3.

TABLE 3

|  | No. of persons who answered "tasty" |
|---|---|
| Product of this invention | 42** |
| Control sample | 18 |

**(Significant test): Significantly different on a level of significance of 1%.

EXAMPLE 6

Barley and malt, used as starting materials, were saccharified and fermented and then twice distilled by means of a pot still. The middle distillate fractions of the second distillation were collected. Ten grams of the flavoring material obtained in Example 1 was added to 3 liters of said middle distillate fraction and dipped for 1 month, after which the solid was filtered off. A fermentation grade of ethyl alcohol and water were added to the leaching solution so that the alcohol concentration came to 42% (V/V), the mixture was filtered in the usual manner, and the filtrate was bottled to obtain a product (whisky) excellent in flavor and taste.

EXAMPLE 7

A wine produced by the conventional process was subjected to simple distillation to obtain a brandy. To 100 liters of the brandy, 600 g of the flavoring material obtained in Example 2 was added, into which was compounded 20 liters of brandy aged in barrel. Then, it was again stored in a barrel, the concentration of alcohol was adjusted, and it was filtered and bottled to obtain a brandy (alcohol concentration: 40% V/V) excellent in flavor and taste.

EXAMPLE 8

In a wide-mouthed bottle having a capacity of 4 liters, 1.5 liters of shochu (grade A), 10 g of the flavoring material obtained in Example 2 and 800 g of crystal sugar were mixed together, allowed to stand for 2–3 days, and then again mixed together. Then, 1 kg of ume (Japanese plum) fruits was added, the bottle was tightly sealed, and the content was stored for about 3 months. Thus, an ume liqueur (alcohol concentration: 25% V/V) having a good flavor and taste was obtained.

Subsequently, an organoleptic test was performed by a tasting panel consisting of 30 skilled persons on the ume liqueur obtained in the above-mentioned manner (product of this invention) and a control ume liqueur produced by repeating the above-mentioned procedure except that the flavoring material of Example 2 was not added. The results are shown in Table 4.

TABLE 4

|  | No. of persons who answered "tasty" |
|---|---|
| Product of this invention | 24** |
| Control sample | 6 |

**(Significant test): Significantly different on a level of significance of 1%.

EXAMPLE 9

Twenty cracked eggs and 600 g of sugar were mixed together in a bowl, to which were added 15 g of the flavoring material obtained in Example 1 and 20 ml of brandy, into which was further mixed a mixture consisting of 600 g of wheat flour and 20 g of baking powder in 3–4 portions. Then, 700 g of fused butter was added and mixed thereinto, and the resulting mixture was dividingly poured into molds of madeleine. Then, it was baked for about 10 minutes in the usual oven to obtain madeleines excellent in flavor and taste.

EXAMPLE 10

Five hundred grams of mutton was dipped in a barbecue sauce and then baked in an oven, to which were added 1 g of the flavoring material obtained in Example 2, 1 g of pepper and 1 ml of fresh lemon juice. Thus, a baked mutton quite excellent in flavor and taste was obtained.

EXAMPLE 11

One kilogram of apple, 1 kg of carrot, 0.2 kg of parsley, 3 kg of onion, 0.5 kg of ginger and 0.5 kg of garlic were sliced and introduced into a pressure cooker, 5 liters of water, 1 kg of edible salt and 2.8 kg of sugar were added thereto, and the mixture was cooked under elevated pressure for 120 minutes and allowed to stand for 12 hours. Then, 0.2 liter of the flavoring material obtained in Example 1, 2 liters of soy, 2 g of sage, 2 g of laurel, 2 g of pepper and 2 g of thyme were mixed thereinto, the resulting mixture was cooked for 60 minutes, 2.7 liters of vinegar was added, and the whole mixture was filtered to obtain 18 liters of a liquid sauce (acetic acid: 1.5% W/V; sodium chloride: 7.5% W/V; sugar: 16.8% W/V) excellent in flavor and taste.

Subsequently, an organoleptic test was carried out by a tasting panel consisting of 60 skilled persons on the liquid sauce produced in the above-mentioned manner (product of this invention) and a control liquid sauce produced by repeating the above-mentioned procedure except that the flavoring material of Example 3 was not added. The organoleptic test was carried out by putting the sauce on pork cutlet. The results are shown in Table 5.

TABLE 5

|  | No. of persons who answered "tasty" |
| --- | --- |
| Product of this invention | 45** |
| Control sample | 15 |

**(Significant test): Significantly different on a level of significance of 1%.

EXAMPLE 12

Barley and malt, used as starting materials, were saccharified and fermented and then twice distilled by means of pot still. In each run of the distillations, the middle distillate fraction was collected. To 5 liters of said middle distillate fraction, 0.5 liter of the flavoring material obtained in Example 3, water and fermentation grade of ethyl alcohol were added so that the concentration of alcohol came to 40% (V/V). Then the mixture was filtered and bottled in the usual manner to obtain a product (whisky) excellent in flavor and taste.

EXAMPLE 13

A wine produced by the usual process was subjected to simple distillation to obtain a brandy. To 100 liters of the brandy, 10 liters of the flavoring material obtained in Example 3 was added, into which was compounded 20 liters of brandy aged in barrel. Then, it was again stored in a barrel, the concentration of alcohol was adjusted, and it was filtered and bottled to obtain a product (brandy) excellent in flavor and taste.

EXAMPLE 14

In a wide-mouthed bottle having a capacity of 4 liters, 1.5 liters of shochu and 800 g of crystal sugar were mixed together, allowed to stand for 2-3 days and then again mixed together. Then, 1 kg of ume fruits was added, the bottle was tightly sealed, and the content was stored for about 3 months to obtain an ume liqueur. Then, 0.5 liter of the flavoring material obtained in Example 3 was mixed thereinto to obtain an ume liqueur excellent in flavor and taste.

Subsequently, an organoleptic test was carried out by a tasting panel consisting of 30 skilled persons on the ume liqueur produced in the above-mentioned manner (product of this invention) and a control ume liqueur produced by repeating the above-mentioned procedure except that the flavoring material of Example 3 was not added. The results are shown in Table 6.

TABLE 6

|  | No. of persons who answered "tasty" |
| --- | --- |
| Product of this invention | 26** |
| Control sample | 4 |

**(Significant test): Significantly different on a level of significance of 1%.

EXAMPLE 15

One thousand milliliters of milk was introduced into a vessel and heated. Just before the milk commenced boiling, 3,000 g of sugar was added and completely dissolved in the vessel, after which the mixture was allowed to cool to obtain a solution of sugar in milk. In another vessel, 4,000 g of fresh butter was whipped and foamed, to which was slowly added the above-mentioned solution of sugar in milk. Further, 100 ml of evaporated milk, 100 ml of the flavoring material obtained in Example 3 and 30 ml of vanilla essence were added, and the mixture was homogenized and whipped to obtain a smooth butter cream having a good flavor and taste.

EXAMPLE 16

A mixture consisting of 1,100 g of raisin (washed with water and coarsely chopped), 250 g of lemon peel (finely chopped), 250 g of orange peel (finely chopped), 250 g of citron peel (finely chopped), 250 g of cherry (finely chopped), 100 g of date (coarsely chopped), 200 g of annato (lightly baked and finely chopped) and 200 g of almond was thoroughly mixed, into which were mixed 80 g of cinnamon, 200 g of allspice, 180 g of nutmeg and 8 g of clone. While sprinkling 700 ml of the flavoring material obtained in Example 3 and 700 ml of sherry over the mixture, it was introduced into a glass bottle having a capacity of 20 liters. After sprinkling 300 g of white granulated sugar over the surface, a lid was shut down and tightly sealed and the bottle was stored in the dark at low temperature for about 4 months. Thus, a minced meat excellent in flavor and taste was obtained.

EXAMPLE 17

In a vessel having a capacity of 10 liters, 2,000 ml of water and 4,000 g of white granulated sugar were heated to obtain a sugar solution. After adding 300 g of raisin and cooling the mixture, 300 ml of fresh lemon juice was added and the whole mixture was preserved for 24 hours. Then, 1000 ml of the flavoring material obtained in Example 3 was added. Thus, a raisin (fruit preserved in wine and sugar) excellent in flavor and taste was obtained.

EXAMPLE 18

Cacao beans were roasted in a roaster to give the beans a chocolate flavor. After cooling the beans, they were broken into fine pieces and their shells were removed by means of peeling machine. Further, the malts of the beans were removed by means of jam separator, and the residue was finely powdered by means of attritor to obtain a bitter chocolate (cacao paste). Into 180 kg of the cacao paste, 16 kg of cacao butter, 430 kg of powdered sugar and 5 kg of lecithin were added and mixed. The resulting mixture was thoroughly and finely ground by means of refiner and then kneaded for a continuous 48 hours by means of coating machine and tempering machine. The base chocolate thus obtained was formed into hollow granular chocolate by means of shell molding machine. After turning over, cooling and solidification, a predetermined quantity, per one granule, of a mixture consisting of 50 liters of liqueur and 50 liters of the flavoring material obtained in Example 3 was injected into the granules, and the hollows of the granules were sealed from outside with the base chocolate. Thus, a shell chocolate excellent in flavor and taste was obtained.

EXAMPLE 19

(1) A mixture consisting of 140 kg of wheat flour and 1 kg of baking powder was twice passed through a sieve and thoroughly mixed together. (2) Eighty kilograms of butter was placed in a bowl and softly kneaded into a creamy form by means of a beater, 120 kg of sugar was added, and the mixture was further kneaded.

Then, (2) was added portionwise to raw egg, taken from 2,000 pieces of eggs, and mixed by means of a beater. Then, 30 liters of the flavoring material obtained in Example 4, 1 liter of vanilla essence and finely chopped raisin, lemon peel, orange peel, walnut and cherry were added thereto and homogenized. Subsequently, (1) was added in 3 portions and homogenized by means of a wooden dipper. The mixture thus obtained was introduced into a mould for 1,000 pieces of 18 cm pound cake. After flattening the surface with a spatula, the mixture was baked for about 40 minutes in an oven heated to about 170° C. After baking it, a mixture prepared by adding 10 liters of water to 30 liters of a jam and heating it was coated on the surface, and the cakes were wrapped in aluminum foil. Thus, pound cakes excellent in flavor and taste were obtained.

EXAMPLE 20

Twenty kilograms of brown miso, 20 kg of white miso, 10 kg of sugar and 10 liters of dried bonito broth were thoroughly mixed together, to which was then added 40 liters of broth. The mixture was heated in a pan to obtain a miso paste, into which was added and mixed 20 liters of the flavoring material obtained in Example 4. Thus, a miso paste excellent in flavor and taste was obtained.

What is claimed is:

1. A flavoring material comprising a flavoring wooden material obtained by treating a wooden raw material selected from the group consisting of raw white oak and raw Japanese oak with pressure and heat for 30 seconds or longer in the presence of a saturated steam having a pressure of 4 to 15 kg/cm$^2$.G or a super-heated steam having a temperature of 164° to 300° C. and thereafter rapidly or slowly discharging said pressure and heat-treated wooden raw material into an atmosphere having a lower pressure.

2. A liquid flavoring material obtained by subjecting a wooden material treated with pressure and heat to an extraction treatment with a solvent and then removing the residue from the extract, said wooden material treated with pressure and heat being obtained by treating a wooden raw material selected from the group consisting of raw white oak and raw Japenese oak with pressure and heat for 30 seconds or longer in the presence of a saturated steam having a pressure of 4 to 15 kg/cm$^2$. G or a super-heated steam having a temperature of 164° to 300° C. and thereafter rapidly or slowly discharging said pressure and heat-treated wooden raw material into an atmosphere having a lower pressure.

3. A liquid flavoring material according to claim 2, wherein said solvent is at least one member selected from the group consisting of alcohol, alcohol-containing liquids, water and liquefied carbon dioxide.

4. A process for producing a food product excellent in flavor and taste, said food product selected from the group consisting of foods and drinks, comprising adding a flavoring material to said food product or into the process for producing said food product, said flavoring material comprising a flavoring wooden material obtained by treating a wooden raw material selected from the group consisitng of raw white oak and raw Japanese oak with pressure and heat for 30 seconds or longer in the presence of a saturated steam having a pressure of 4 to 15 kg/cm$^2$.G or a super-heated steam having a temperature of 164° to 300° C. and thereafter rapidly or slowly discharging said pressure and heat-treated wooden raw material into an atmosphere having a lower pressure.

5. A process for producing a food product excellent in flavor and taste, said food product selected from the group consisting of foods and drinks, comprising adding a liquid flavoring material to said food product or into the process for producing said food product, said liquid flavoring material being obtained by treating a wooden raw material selected from the group consisting of raw white oak and raw Japanese oak with pressure and heat for 30 seconds or longer in the presence of a saturated steam having a pressure of 4 to 15 kg/cm$^2$.G or a super-heated steam having a temperature of 164° to 300° C., thereafter rapidly or slowly discharging said pressure and heat-treated wooden raw material into an atmosphere having a lower pressure, extracting said discharged pressure and heat-treated wooden raw material by the use of a solvent and removing the residue from the extract.

6. A process for producing a food product excellent in flavor and taste according to claim 5, wherein said solvent is at least one member selected from the group consisting of alcohol, alcohol-containing liquids, water and liquefied carbon dioxide.

7. A process for producing a food product excellent in flavor and taste according to claim 4 or 5 wherein said food product is selected from the group consisting of seasonings, unbaked cakes, alcoholic drinks, foods preserved in sugar, and chocolates.

8. A process for producing a wooden flavoring material comprising treating a wooden raw material selected from the group consisting of raw white oak and raw Japanese oak with pressure and heat for 30 seconds or longer in the presence of a saturated steam having a pressure of 4 to 15 kg/cm$^2$.G or super-heated steam having a temperature of 164° to 300° C. and thereafter rapidly or slowly discharging said pressure and heat-treated wooden raw material into an atmosphere having a lower pressure.

9. A process for producing a liquid flavoring material comprising subjecting a wooden material treated with pressure and heat to an extraction treatment with a solvent and then removing the residue from the extract, said wooden material being obtained by treating a wooden raw material selected from the group consisting of raw white oak and raw Japanese oak with pressure and heat for 30 seconds or longer in the presence of saturated steam having a pressure of 4 to 15 kg/cm$^2$.G or a super-heated steam having a temperature of 164° to 300° C. and thereafter rapidly or slowly discharging said pressure and heat-treated wooden raw material into an atmosphere having a lower pressure.

10. A process for producing a liquid flavoring materal according to claim 9 wherein said solvent is at least one member selected from the group consisting of alcohol, alcohol-containing liquids, water and liquefied carbon dioxide.

* * * * *